Feb. 16, 1937.  D. F. CHAMBERS  2,071,198
BEARING
Filed Aug. 12, 1935
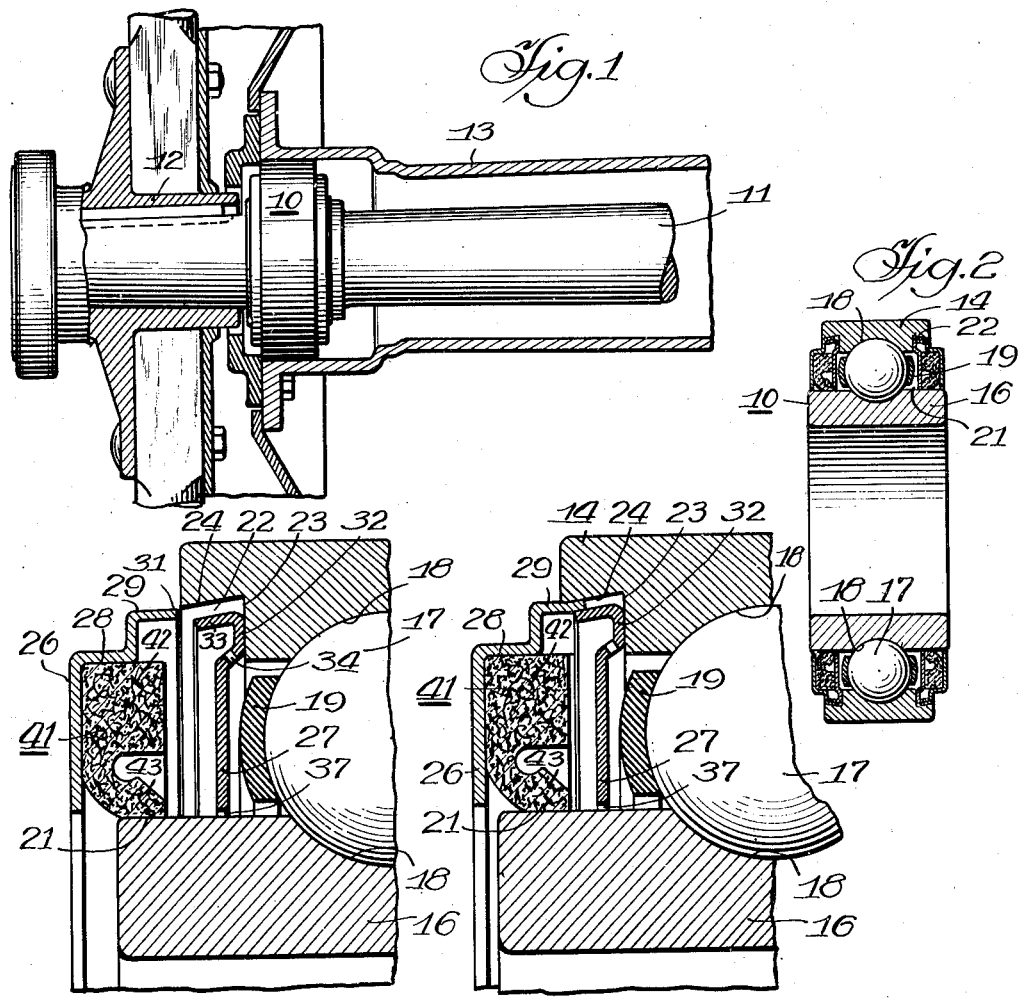
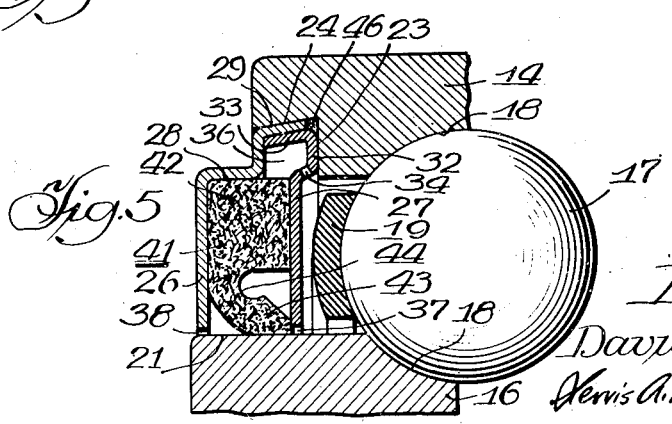
Inventor,
David F. Chambers
Jervis A. Wright Atty.

Patented Feb. 16, 1937

2,071,198

UNITED STATES PATENT OFFICE 2,071,198

BEARING

David F. Chambers, Lancaster, Pa., assignor to Bearings Company of America, Lancaster, Pa., a corporation of Delaware Application August 12, 1935, Serial No. 35,783

5 Claims. (Cl. 308—187.2)

My invention relates to bearings, and more particularly to sealing devices for retaining lubricant in bearings, such as enable the manufacturer to supply to the user a bearing lubricated with an ample supply of the proper lubricant for its useful life, and which may be sold and handled as a unit. It has for its principal object to provide improvements in the construction of such bearings and the lubricant-retaining devices therefor, whereby more effectual sealing of the bearing against the escape of lubricant is obtained than is provided by devices now known in the art. The invention has been illustrated in connection with a ball bearing of the kind frequently used in the construction of motor vehicles, but is not limited in application to structures of this particular type but may be employed in anti-friction bearings generally.

Bearings of the character designated are frequently installed in inaccessible locations, such that adequate lubrication from outside sources is inconvenient if not impossible, of which a typical example is the rear wheel bearing of a motor vehicle. It has heretofore been proposed to provide such bearings with closures intended to retain lubricant, and to prepack the bearing space with oil or grease. Structures of this nature heretofore provided have been expensive to construct and difficult to assemble within the required limits of accuracy and have been unsatisfactory in permitting the escape of lubricant, resulting in damage to and failure of otherwise satisfactory bearings from lack of oil. Such leakage is aggravated by the pressure caused by the expansion of the lubricant due to heat and movement of the bearing parts.

One of the objects of my invention is to provide a bearing having closure means which will effectively prevent the leakage of lubricant of any kind.

Another object of the invention is to provide a device of this nature in which expansion of the lubricant within the bearing will not result in leakage or in damage to the bearing or its seal.

A further object of the invention is to provide a device which is strong and rigid and which may be easily and inexpensively manufactured and assembled to the required degree of accuracy by ordinary mechanical methods.

Other parts of the invention will appear from the following description, taken in connection with the drawing, which forms a part of this specification, and in which:

Fig. 1 is a view, partially in longitudinal section, of a part of the axle housing and wheel hub of a motor vehicle, showing one application of a bearing constructed in accordance with my invention;

Fig. 2 is a view in axial section through a bearing such as is shown in Fig. 1, provided with the lubricant retaining means of the invention;

Figs. 3 and 4 are enlarged detailed sectional views showing successive steps in the assembly of the parts of the bearing seal with the bearing, and Fig. 5 is a view similar to Figs. 3 and 4 showing the assembled bearing and seal.

Referring to the drawing, at 10 is shown generally an annular bearing of conventional construction such as is used to support the driving axle 11 of a motor vehicle adjacent the wheel hub 12 in the housing 13 thereof. The bearing 10 comprises spaced race members or rings 14 and 16 between which are disposed rolling load members such as the balls 17. The balls 17 are disposed in a circular row and are received and track in circular grooves or races 18 provided in the adjacent faces of the race rings 14 and 16. A retainer 19 of well known construction is provided to hold the balls and space them circumferentially in the races. In the construction illustrated, the outer race member 14 is mounted in the axle housing 13 and the shaft 11 is mounted in the bore of the inner race member 16, but it will be understood that the invention is not limited to bearings so arranged and mounted.

One of the race members is preferably longer than the other and is formed with a cylindrical surface 21, which may be ground or otherwise formed smooth for running engagement with the seal. The other race member, here illustrated as the outer member 14, is provided with a circular recess or groove 22, disposed opposite to the surface 21 and having a radially disposed plane face 23 and a conical face 24. The conical surface 24 is disposed at a small angle to the bearing axis so that the recess is tapered or undercut, with its greatest-diameter toward the mid-plane of the bearing.

The sealing device or closure of this invention comprises an oil impervious packing member or ring carried by one of the race members in operative, sealing contact with a sealing surface on the other race member, and supporting and retaining means for the packing member. In the embodiment illustrated, the sealing surface 21 is formed on the inner race member 16 and the supporting and retaining means is secured to and carried by the outer race member 14. Said means includes a pair of axially spaced annular retaining members or plates 26 and 27, each of which has a radially disposed flat portion. The outer plate 26 is preferably dished or cupped near its outer end to provide an internal circular shoulder 28, and is provided at its periphery with an in-turned flange 29. In its form before assembly of the parts the flange 29 is substantially parallel to the bearing axis, as shown in Fig. 3, and its rim 31 is of a diameter to just enter the outer end of the recess 22.

The inner plate 27 is preferably offset near its outer end as shown at 32, and is provided at its periphery with an out-turned flange 33 bent back at an angle such that its surface is substantially parallel to the conical surface 24. The dimensions of the plate 27 are such that its outer diameter at the bend of flange 33 will permit it to enter the recess 22, and when positioned in said recess in axial alignment with the bearing, and with its offset portion 32 in contact with the radial face 23, as shown in Figs. 3, 4 and 5, the flange 33 will be spaced from the conical face 24 of the recess an amount equal to or slightly less than the thickness of the flange 29. The length of the flange 33, which determines the axial spacing of plates 26 and 27 when the parts are assembled, may conveniently be of a length equal to or slightly less than the axial depth of the recess 22 minus the thickness of the plate 26. This length may be less, however, if greater compression of the packing member is desired. The plate 27 may also be provided with one or more ports 34, connecting the bearing space with the outer portion of the annular space 36 defined by the plates, which thus forms an expansion chamber.

Each of the plates is provided with a central aperture of a diameter to enable the plate to pass over the end of the inner race member 16. Of these, the aperture 37 in the inner plate 27 has considerable clearance with the cylindrical surface 21, into which clearance the packing member may expand under pressure. The aperture 38 in the outer plate 26 is a relatively close fit on the surface 21, of the order of 0.015 inch, to prevent dust and dirt from readily entering the seal.

The packing member 41 is rigidly clamped between the plates 26 and 27 when the device is assembled, and is radially positioned against the shoulder 28. It is preferably of annular form, having a portion 42 of generally rectangular section, and a flange portion 43 projecting radially inward toward the surface 21, and axially inward toward the inner plate, said portions 42 and 43 being conveniently connected by a neck portion 44 to increase the resilience of the pressure of the packing on the surface 21. The packing may be made of any suitable material which is sufficiently resilient, impervious to lubricants of all kinds and resistant to heat. Some of the compositions now commercially available containing asbestos, gutta percha, and synthetic resins such as bakelite, are suitable for use as such packing, but the invention is not limited to packing materials of this nature and as the composition of the packing is no part of the invention, further description thereof is unnecessary.

It being understood that the bearing is provided with a sealing device at each end thereof, as shown in Fig. 2, and that the space between the race members containing the balls and their retainer has been initially packed with a suitable lubricant, the assembly and operation of this sealing device will be apparent from the foregoing description. The inner plate 27 is placed in the recess 22 in axial alignment with the bearing and with its offset portion 32 in contact with the radial face 23. This plate may, if desired, be cemented to the face 23 with any suitable cement which is insoluble in oil. The packing member is then positioned in the cupped portion of the outer plate 26, and its flange portion 43 is placed over the cylindrical end of the inner race member 16, in contact with the sealing surface 21, as shown in Fig. 3. The rim 31 of the outer plate 26 is then started in the inclined annular space between the conical face 24 and the flange 33, springing the flange 29 radially outward and the flange 33 radially inward, as shown in Fig. 4. The outer plate 26 is then driven or forced axially inward into final position, as shown in Fig. 5, by any suitable tool or press, not shown, wedging the flange 29 between the inclined surface 24 and the flange 33, and effectually locking the parts together and to the outer race member to provide an oil tight seal. The plate 26 is preferably driven inwardly until it contacts the rim of the flange 33, compressing the packing ring portion 42 between the plates and the shoulder 28, thus clamping the packing in position and forcing the packing flange portion 43 into contact with the sealing surface 21, and with the inner plate 27 at and adjacent to the aperture 37. In operation, the inner race member rotates relatively to the packing member, which is in tight oil-sealing contact with its surface 21 as described.

If desired, a gasket 46 of any suitable composition may be placed in the recess prior to assembly of the parts, being compressed therein by the rim 31 upon assembly to fill the annular space between said rim and the face 23, as shown in Fig. 5.

If by reason of increased bearing temperature, or churning of the lubricant, or for any other reason the lubricant expands materially, it will pass through the ports 34 into the annular space 36 between the plates, the flange 33 and the packing material, which space forms an expansion chamber for the relief of such pressure. Lubricant which thus expands into the chamber 36, as upon an increase in temperature, is subsequently drained back into the bearing space through the ports 34 when the bearing conditions have again become normal.

It will be evident that the device above described provides a strong, rigid seal for bearings, in which the packing material is rigidly clamped between the plates and in oil-tight contact with the sealing surface, thus preventing the escape of lubricant between the relatively moving parts. The effectiveness of the seal is enhanced by expansion of the packing portion 43 into the aperture 37.

It will also be seen that by reason of the elastic deformation of the flanges of the plate members when these are wedged in place upon assembly, a rigid connection of the plates to each other and to the outer race member is secured, thus ensuring positive retention of the packing. By reason of the large surface contact between the wedged flanges of the plates, an adequate seal is also provided at this point against the leakage of lubricant, the large contact surfaces compensating for minor irregularities and errors in manufacture. Moreover the disposition of the parts provided by this invention permits the grinding of the faces of the recess in the race member and the contacting surfaces of the plate flanges, if desired, so that accuracy of contact and complete freedom from leakage may be obtained. This is of particular value in the smaller sizes of bearings, which are usually more difficult to keep tight.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a bearing having race members, a circular undercut recess in one of said members having a conical face and a radially disposed face, a plate having a flange disposed in the recess parallel to the conical face and having a portion in contact with the radial face, a second plate spaced from the first plate and having a flange wedged between the first plate flange and the conical face, and lubricant impervious material in contact with the other race member carried between said plates.

2. In a bearing having race members, an undercut circular recess in one of said members having a conical face and a radially disposed face spaced circular plates having peripheral flanges in overlapped relation in said recess one flange being elastically deformed to lock the other flange against the conical face in the recess, and lubricant impervious packing clamped between said plates having a surface in sealing contact with the other race member.

3. In a bearing having race members, a lubricant seal comprising a ring of lubricant impervious material in sealing engagement with one of the race members, a pair of spaced plates confining said ring, said plates being carried by the other race member and defining an annular space around said ring, and a port in one of said plates connecting said space with the space between the race members to provide for expansion of lubricant.

4. In an annular bearing having race members, a lubricant retaining closure including a plate having a conical flange, a plate having an axially disposed flange, an undercut groove in one of the race members adapted to receive said flanges in overlapping relation and to distort the axially disposed flange into the groove and into engagement with the conical flange, and packing material clamped between said plates engaging the other race member.

5. In an annular bearing having race members, a lubricant retaining closure including a plate having a conical flange, a plate having an axially disposed flange, an undercut groove in one of the race members adapted to receive and clamp said flanges against each other and against the race member in lubricant-retaining engagement, one of said flanges contacting the plate of the other flange to space the plates, and packing material carried in the space between said plates engaging the other race member.

DAVID F. CHAMBERS.